United States Patent
Watanabe et al.

(10) Patent No.: US 10,394,939 B2
(45) Date of Patent: Aug. 27, 2019

(54) RESOLVING OUTDATED ITEMS WITHIN CURATED CONTENT

(71) Applicant: FUJITSU LIMITED, Kawasaki-shi, Kanagawa (JP)

(72) Inventors: Takuro Watanabe, Santa Clara, CA (US); Jun Wang, San Jose, CA (US); Kanji Uchino, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 745 days.

(21) Appl. No.: 14/675,517

(22) Filed: Mar. 31, 2015

(65) Prior Publication Data

US 2016/0292207 A1 Oct. 6, 2016

(51) Int. Cl.
*G06F 17/22* (2006.01)
*G06F 16/955* (2019.01)
*G06F 16/958* (2019.01)

(52) U.S. Cl.
CPC ........ *G06F 17/2288* (2013.01); *G06F 16/955* (2019.01); *G06F 16/958* (2019.01)

(58) Field of Classification Search
CPC ........... G06F 17/2288; G06F 17/30876; G06F 17/3089; G06F 17/30887; G06F 17/2235; G06F 16/955; G06F 16/958; H04L 67/02
See application file for complete search history.

(56) References Cited

U.S. PATENT DOCUMENTS

| | | | | | |
|---|---|---|---|---|---|
| 5,860,071 A | * | 1/1999 | Ball | .................. | G06F 17/30899 707/695 |
| 5,941,944 A | * | 8/1999 | Messerly | .......... | G06F 17/30067 707/999.003 |
| 5,974,445 A | * | 10/1999 | Pivnichny | ......... | G06F 17/30884 707/E17.114 |
| 6,219,679 B1 | * | 4/2001 | Brisebois | .......... | G06F 17/30855 707/E17.013 |

(Continued)

FOREIGN PATENT DOCUMENTS

WO    2007/080171 A1    1/2007

OTHER PUBLICATIONS

Harrison, T.L. et al.,"Just-in-Time Recovery of Missing Web Pages," © 2006, ACM, pp. 145-156.*

(Continued)

*Primary Examiner* — Chau T Nguyen
*Assistant Examiner* — James H. Blackwell
(74) *Attorney, Agent, or Firm* — Maschoff Brennan

(57) ABSTRACT

A method includes determining whether an electronic source link of a curated item is broken. In response to the electronic source link not being broken, the method includes determining whether linked content at the electronic source link is consistent with a version of a document originally accessed on which the curated item is based (item document). In response to the linked content not being consistent with the item document, the method includes locating an alternative item or an alternative source for an inconsistent (Continued)

source link. In response to the electronic source link being broken, the method includes locating an alternative item or an alternative source for a broken source link. Following an expiration date of the curated item, the method also includes locating updated content that is relevant to the curated item.

16 Claims, 11 Drawing Sheets

(56) References Cited

U.S. PATENT DOCUMENTS

| | | | | |
|---|---|---|---|---|
| 6,366,923 | B1* | 4/2002 | Lenk | G06F 17/30899 707/706 |
| 6,510,432 | B1* | 1/2003 | Doyle | G06F 17/30864 |
| 6,892,220 | B2* | 5/2005 | Seol | G06F 17/30855 707/E17.013 |
| 7,383,320 | B1* | 6/2008 | Silberstein | G06F 17/3089 707/E17.116 |
| 7,519,573 | B2* | 4/2009 | Helfman | G06F 17/3089 |
| 7,587,398 | B1* | 9/2009 | Fredricksen | G06F 17/30899 |
| 7,689,667 | B2* | 3/2010 | Lal | H04L 29/06 709/218 |
| 7,818,312 | B2* | 10/2010 | Broder | G06F 17/3089 707/709 |
| 8,108,785 | B2* | 1/2012 | Matthews | G06F 3/0481 715/230 |
| 8,205,172 | B2* | 6/2012 | Wong | G06F 17/30884 715/704 |
| 8,635,220 | B2* | 1/2014 | Garthwaite | G06F 17/30817 707/736 |
| 8,656,295 | B2* | 2/2014 | Decker | G06F 3/0481 715/770 |
| 8,826,161 | B2* | 9/2014 | Yamada | G06T 11/60 707/E17.119 |
| 8,875,172 | B1* | 10/2014 | Chang | H04N 21/235 725/109 |
| 8,881,018 | B2* | 11/2014 | Kondasani | G06F 17/30887 714/25 |
| 9,003,273 | B2* | 4/2015 | Yamada | G06F 17/2235 715/205 |
| 9,075,777 | B1* | 7/2015 | Pope | G06F 17/2235 |
| 9,075,885 | B2* | 7/2015 | Walker | G06F 17/30887 |
| 9,098,597 | B2* | 8/2015 | Matas | G06F 17/30905 |
| 9,141,718 | B2* | 9/2015 | Forstall | G06F 9/543 |
| 9,223,766 | B2* | 12/2015 | Chub | G06F 17/2235 |
| 9,317,226 | B2* | 4/2016 | Aoki | G06F 3/1204 |
| 9,361,375 | B2* | 6/2016 | Chi | G06F 17/30864 |
| 9,584,580 | B2* | 2/2017 | Brundage | G06F 17/30887 |
| 9,672,114 | B2* | 6/2017 | Caliz | G06F 11/1451 |
| 9,712,290 | B2* | 7/2017 | Callaghan | H04L 1/244 |
| 2001/0025284 | A1* | 9/2001 | Seol | G06F 17/30855 |
| 2003/0158953 | A1* | 8/2003 | Lal | H04L 29/06 709/230 |
| 2004/0083192 | A1* | 4/2004 | Elliott | G06F 11/24 706/26 |
| 2005/0021997 | A1* | 1/2005 | Beynon | G06F 17/30887 726/2 |
| 2005/0183004 | A1* | 8/2005 | Lerner | G06F 17/241 715/205 |
| 2006/0041589 | A1* | 2/2006 | Helfman | G06F 17/3089 |
| 2006/0230343 | A1* | 10/2006 | Armandpour | G06F 11/3672 715/205 |
| 2007/0130123 | A1* | 6/2007 | Majumder | G06F 17/3069 |
| 2008/0104497 | A1* | 5/2008 | Lumley | G06F 17/218 715/209 |
| 2008/0294981 | A1* | 11/2008 | Balzano | G06F 17/21 715/256 |
| 2009/0327466 | A1* | 12/2009 | Lopez | H04L 29/12594 709/223 |
| 2010/0262679 | A1* | 10/2010 | Liu | H04L 43/024 709/220 |
| 2011/0202827 | A1* | 8/2011 | Freishtat | G06Q 30/02 715/234 |
| 2011/0289434 | A1* | 11/2011 | Kieft | G06F 17/30887 715/760 |
| 2012/0011243 | A1* | 1/2012 | Chuang | G06Q 30/02 709/224 |
| 2012/0259832 | A1* | 10/2012 | Walker | G06F 17/30887 707/709 |
| 2013/0055100 | A1* | 2/2013 | Kondasani | G06F 17/30887 715/739 |
| 2013/0060858 | A1* | 3/2013 | Freishtat | G06Q 30/02 709/204 |
| 2013/0204981 | A1 | 8/2013 | Brundage et al. | |
| 2013/0304871 | A1* | 11/2013 | Silverman | H04L 67/10 709/219 |
| 2014/0053053 | A1* | 2/2014 | Hogue | G06F 17/2247 715/234 |
| 2014/0108901 | A1* | 4/2014 | Carriero | G06F 17/30884 715/206 |
| 2014/0181633 | A1* | 6/2014 | Mo | G06F 17/2247 715/234 |
| 2014/0310613 | A1* | 10/2014 | Megiddo | H04L 65/403 715/753 |
| 2014/0344739 | A1* | 11/2014 | Yoon | G06F 17/30884 715/769 |

OTHER PUBLICATIONS

Park, S-T. et al.,"Analysis of Lexical Signatures for Finding Lost or Related Documents," © 2002, ACM, pp. 11-18.*
Martinez-Romo, J. et al.,"Updating Broken Web Links: An Automatic Recommendation System," © 2011, Elsevier, pp. 183-203.*
Martinez-Romo, J. et al.,"Analyzing Information Retrieval Methods to Recover Broken Web Links," © 2010, Springer-Verlag Heidelberg, pp. 26-37.*
Dalai, Z. et al.,"Managing Distributed Collections: Evaluating Web Page Changes, Movement, and Replacement," © 2004, ACM, pp. 160-168.*
Morishima, A. et al.,"PageChaser: A Toll for the Automatic Correction of Broken Web Links," © 2008, IEEE, pp. 1486-1488.*
http://wordpress.org/plugins/broken-link-checker/, Retrieved on Apr. 3, 2015.
http://mbrsolution.com/tutorial/google-webmaster-tools-broken-links-tutorial.php, Retrieved on Apr. 3, 2015.
http://www.powermapper.com/products/sortsite/index.htm, Retrieved on Apr. 3, 2015.
http://storify.com/, Retrieved on Apr. 3, 2015.
http://www.scoop.it/, Retrieved on Apr. 3, 2015.
http://learni.st/, Retrieved on Apr. 3, 2015.

* cited by examiner

RESOLVING OUTDATED ITEMS WITHIN CURATED CONTENT

FIELD

The embodiments discussed herein are related to resolving outdated items within curated content.

BACKGROUND

In informal learning, a student may create a content curation (curation) that pertains to a topic. The curation may include a list of curated items (items), such as digital files and/or online media relating to the topic, which are organized by a curator, e.g., the student. The curation may also include content created by the student that characterizes or otherwise describes the items. The items in the curation may become outdated. Additionally, it may be difficult to identify outdated items.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method includes determining whether an electronic source link of a curated item is broken. In response to the electronic source link not being broken, the method includes determining whether linked content at the electronic source link is consistent with a version of a document originally accessed on which the curated item is based (item document). In response to the linked content not being consistent with the item document, the method includes locating an alternative item or an alternative source for an inconsistent source link. In response to the electronic source link being broken, the method includes locating an alternative item or an alternative source for a broken source link. Following an expiration date of the curated item, the method also includes locating updated content that is relevant to the curated item.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

A student may create a content curation (curation) that pertains to a topic. The curation may include a list of curated items (items), such as digital files and/or online media relating to the topic and which are organized by a curator, e.g., the student. The curation may also include content created by the student that characterizes or otherwise describes the items in a curated content (curation) may become outdated, which may reflect poorly on the student or another curator who created the curation. It may be difficult for the curator to check whether the items in the curation are outdated because the items may be scattered among multiple sources and controlled by third parties. Generally, outdated items may be categorized into three types. A first type may be broken electronic source links. For example, a link to the item in the curation that no longer directs an audience to an active source may be a considered a broken source link. A second type may be linked content inconsistency. For example, linked content inconsistency may include information at a source that may be changed such that the source link of an item directs the audience to a source having irrelevant information. A third type may be faded or obsolete items. For example, a source may be periodically updated to include new information such that the associated items in the curation may be stale or obsolete. As such, it may be beneficial to include the updated items in the curation.

Accordingly, some embodiments described herein may include a method to resolve outdated items of a curation. The method may include determining whether one or more source links of each curated item in a curation are broken. In some embodiments, the method may include determining whether each source link is broken. For each broken source link, one or more alternative sources or items may be located and suggested to a student or curator of the curation. For each of the source links that are active, it may be determined whether linked content is consistent with the item or a document representative of the linked content at the time the item was added to the curation. In response to the linked content not being consistent with the item document, the method may include locating and suggesting an alternative item or an alternative source to the student or the curator. Additionally, the method may include determining whether items have expired. Following an expiration date of a curated item, the method also includes locating updated content that is relevant to the curated item. The updated content, the alternative sources or alternative items, the expired items, the broken links, as well as other relevant information may be included in a notification message that is communicated to the student or the curator. This and other embodiments are described with reference to the appended drawings.

Figure 1:
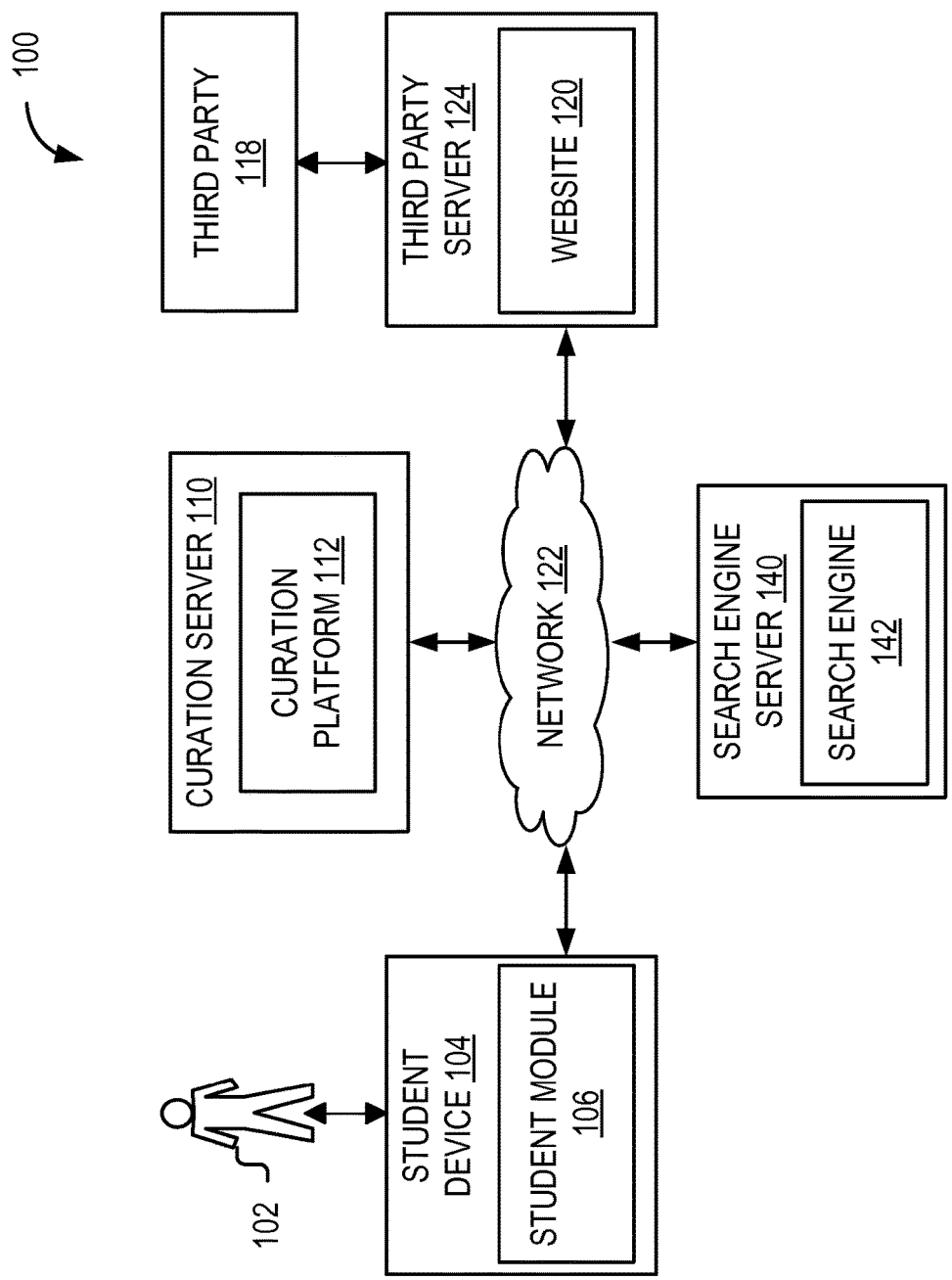
FIG. 1 illustrates an example learning environment.

FIG. 1 illustrates an example learning environment 100 in which one or more embodiments described herein may be implemented. In the learning environment 100, a student 102 may create a content curation (curation) which may include multiple curated items (item or items). The items may include source links associated with the corresponding item. The source links may indicate the source of at least some portion of the items. The items and/or source links of the items may become outdated. Some examples of the items and/or the source links becoming outdated may include a source, such as a website or webpage, from which the item originated being updated to include new information, the source or some portion thereof being removed, and/or the source or some content of the source included in the item expiring.

The learning environment 100 may include a curation platform 112. The curation platform 112 may evaluate the curation created by the student 102 to resolve outdated items and/or outdated source links. For example, the curation platform 112 may determine whether the items are outdated and/or locate alternative sources or alternative items that may be incorporated into the curation. The curation platform 112 may also determine whether items have expired, evaluate the relevancy and currency (e.g., how up-to-date) of the alternative sources, suggest newer and relevant content to the student 102, or some combination thereof.

The learning environment 100 of FIG. 1 may include a student device 104, a curation server 110, a third party server 124, and a search engine server 140 that may communicate with each other via a network 122. The student device 104, the curation server 110, the search engine server 140, and the third party server 124 may be configured to communicate data and information related to the curations via the network 122. For example, information and data included in a website 120 may be accessed from the curation server 110 and/or the student device 104. The curation server 110 and/or the student device 104 may access the website 120 via the network 122 and may be directed to the website 120 by the search engine server 140. Additionally, the curation platform 112 may communicate requests, documents, and notifications with one or more of the student device 104, the search engine server 140, and the third party server via the network 122.

The network 122 may be wired or wireless. The network 122 may have numerous configurations including a star configuration, a token ring configuration, or another suitable configuration. Furthermore, the network 122 may include a local area network (LAN), a wide area network (WAN) (e.g., the Internet), and/or other interconnected data paths across which multiple devices may communicate. In some embodiments, the network 122 may include a peer-to-peer network. The network 122 may also be coupled to or include portions of a telecommunications network that may enable communication of data in a variety of different electronic communication protocols. In some embodiments, the network 122 includes BLUETOOTH® communication networks and/or cellular communications networks for sending and receiving data including via short messaging service (SMS), multimedia messaging service (MMS), hypertext transfer protocol (HTTP), direct data connection, wireless application protocol (WAP), e-mail, etc.

In the depicted embodiment the student 102 may be interfacing with the learning environment 100. The student 102 may include any individual, entity, group of individuals, or group of entities that may be involved in creation/modification of a curation and/or that may own a curation. The student 102 may accordingly create the curation and may be responsible for periodic updates to the curation.

The student 102 may be associated with the student device 104. As used to describe the relationship between the student 102 and the student device 104 the term "associated with" may indicate that the student 102 operates and/or controls the student device 104. Accordingly, communications sent to the student device 104 may be intended for the student 102 and communications received from the student device 104 may be attributed to the student 102.

The student device 104 may enable interaction by the student 102 with the learning environment 100. The student device 104 may include a computing device that includes a processor, memory, and network communication capabilities. For example, the student device 104 may include a laptop computer, a desktop computer, a tablet computer, a mobile telephone, a personal digital assistant ("PDA"), a mobile e-mail device, a portable game player, a portable music player, a television with one or more processors embedded therein or coupled thereto, or other electronic device capable of accessing the network 122.

The student device 104 may include a student module 106. The student module 106 may include code and routines for resolving outdated items. In some embodiments, the student module 106 may act in part as a thin-client application that may be stored on a computing device, such as the student device 104, and in part as components that may be stored on the curation server 110, for instance. In some embodiments, the student module 106 may be implemented using hardware including a processor, a microprocessor (e.g., to perform or control performance of one or more operations), a field-programmable gate array (FPGA) or an application-specific integrated circuit (ASIC). In some other instances, the student module 106 may be implemented using a combination of hardware and software.

The student module 106 or a portion thereof installed on the student device 104 may be configured to enable interaction of the student 102 in the learning environment 100. For example, the student module 106 may be configured to provide a user interface that allows the student 102 to access the curation platform 112, a search engine 142, and the website 120. The student 102 may also create and/or update the curation using the student module 106.

Additionally, the student module 106 may enable communication of information between the student device 104 and the curation server 110. For example, a notification message that includes a list of outdated items may be communicated from the curation platform 112 to the student module 106. The student 102 may accordingly view and/or respond to the notification message.

In some embodiments, the student module 106 or some portion thereof may be included on the curation server 110 and/or the curation platform 112. In these and other embodiments, the student device 104 may access the student module 106 hosted on the curation server 110. One or more of the functionalities discussed herein that are attributed to the student module 106 may be performed by the curation server 110 in response to input of the student 102 received at the student device 104 and communicated to the curation server 110 via the network 122. For example, the student 102 may access the student module 106 or some portion thereof included on the curation server 110 using a browser interface.

A third party 118 may include any entity or entities that controls content of the website 120 hosted on the third party server 124. The third party 118 may include, for example, an individual or a group of individuals that post content such as news stories, articles, videos, audio files, images, and the like. The content on the website 120 may be periodically updated, changed, or removed by the third party 118. For instance, the student 102 may access the website 120 on a first date (e.g., Jan. 1, 2014). The website 120 on the first date may include information that is gathered from the website 120 on the first date and incorporated into the curation. On a subsequent date (e.g., Feb. 1, 2014), the information may have been removed from the website 120 by the third party 118, which may be an outdated item.

The third party server 124 may include a hardware server that includes a processor, memory, and communication capabilities. In the illustrated embodiment, the third party server 124 may be coupled to the network 122 to send and receive data to and from the student device 104, the search engine server 140, and the curation server 110 via the network 122. The third party server 124 may be configured to host the website 120 and enable access to content on the website 120 via the network 122.

For example, using the student device 104, the student 102 may access the website 120 via the network 122 to view content on the website 120. The student 102 may then add an item to a curation including and/or based on the content. Similarly, in the learning environment 100, the curation platform 112 may resolve outdated items and/or source links, such as web links, at least partially by accessing the website 120 via the network 122. The curation platform 112 may determine whether a source link is broken (e.g., no longer hosted), may determine whether the content is no longer consistent with an item in the curation, and may locate alternative sources or alternative items from the website 120.

Additionally, the search engine server 140 may access the website 120 using the search engine 142. For example, one or more search terms may be entered into the search engine 142. The search engine server may, in response, provide search results including the website 120 or a link to the website 120.

The search engine server 140 may include a hardware server that includes a processor, memory, and communication capabilities. In the illustrated embodiment, the search engine server 140 may be coupled to the network 122 to send and receive data to and from the student device 104, the third party server 124, and the curation server 110 via the network 122.

The search engine server 140 may host the search engine 142. The search engine 142 may include a software program that receives as input search terms that form the basis of a search. The search engine 142 may provide search results that include one or more websites such as the website 120, images, and other files that include or may be related to the search terms.

The search engine 142 may be accessible to the student device 104 and/or the curation server 110 via the network 122. For example, the student 102 may be looking for items to include in the curation that relate to a specific topic. The student 102 may enter search terms into the search engine 142 that relate to the specific topic. The search results provided by the search engine 142 may direct the student 102 to the website 120 where information, which may form the basis of an item, may be found. Additionally, the curation platform 112 may access the search engine 142 to locate alternative sources or alternative items. For example, the curation platform 112 may scan an outdated item for terms or phrases that may be useful search terms. The curation platform 112 may enter one or more search terms into the search engine 142. The search results may direct the curation platform 112 to the website 120 where an alternative source or an alternative item may be located.

The curation server 110 may include a hardware server that includes a processor, memory, and communication capabilities. In the illustrated embodiment, the curation server 110 may be coupled to the network 122 to send and receive data to and from the search engine server 140, the student device 104, and the third party server 124 via the network 122. The curation server 110 may include the curation platform 112.

The curation platform 112 may include code and routines for resolving outdated items. In some embodiments, the curation platform 112 may act in part as a thin-client application that may be stored on a computing device, such as the student device 104, and in part as components that may be stored on the curation server 110, for instance. In some embodiments, the curation platform 112 may be implemented using hardware including a processor, a microprocessor (e.g., to perform or control performance of one or more operations), an FPGA or an ASIC. In some other instances, the curation platform 112 may be implemented using a combination of hardware and software.

The curation platform 112 may be configured to resolve outdated items in a curation. The outdated items may be categorized into three types: broken source links, inconsistent linked content, and expired items. Broken source links may be due to content deletion, relocation, and renaming. Inconsistent linked content may be due to an update or modification of information at a source after the item is added to a curation. Expired items may be due to changes of features of software, services, or general passage of time.

To resolve the outdated items, the curation platform 112 may determine whether one or more source links of an item in a curation are broken. For example, the source link may be a web link that includes a universal resource locator (URL) address. The curation platform 112 may send a request such as a HTTP request to a last recorded URL address for the item. In response, the curation platform 112 may receive a failure such as an HTTP Error 404 indicating a broken source link, or the curation platform 112 may be directed to the source indicating an active link. In response to the source link being broken, the curation platform 112 may locate an alternative item or an alternative source. The alternative item or the alternative source may be located from documents cached or otherwise saved at the curation server 110 (stored documents) or via the search engine 142.

In some embodiments, when the source link is active instead of broken, in response to the source link being active, the curation platform 112 may determine whether linked content is consistent with original content on which the item may be based (item document). The curation platform 112 may determine consistency based on a context similarity between the item document and the linked content. In response to the linked content being inconsistent with the item document, the curation platform 112 may locate and suggest an alternative item or an alternative source. As above, the alternative item or the alternative source may be located from the stored documents and/or via the search engine 142.

The curation platform 112 may also determine whether one or more items in a curation have expired based on an expiration date of one or more of the items. The expiration date may be input by the student 102 or may be included in the item, for example. If the curation platform 112 determines that an item has expired, then the curation platform 112 may locate updated content that is relevant to the item.

The curation platform 112 may also generate a notification message. The notification message may indicate whether outdated items are present in a curation, alternative sources or alternative items, actions taken to resolve the outdated items, and the like. For example, the notification message may indicate a broken source link of an item, whether linked content is consistent with item documents, and updated content for expired items. The curation platform 112 may communicate the notification message to the student module 106.

Modifications, additions, or omissions may be made to the learning environment 100 without departing from the scope of the present disclosure. Specifically, embodiments of the learning environment 100 are depicted in FIG. 1 as including one student device 104 that is associated with one student, one curation server 110, one search engine server 140, and one third party server 124 that is associated with one third party 118. However, the present disclosure applies to the learning environment 100 including one or more student devices 104 that may be associated with one or more students 102, one or more curation servers 110, one or more third party servers 124, one or more search engine servers 140, or any combination thereof.

Moreover, the separation of various components in the embodiments described herein is not meant to indicate that the separation occurs in all embodiments. Additionally, it may be understood with the benefit of this disclosure that the described components may be integrated together in a single component or separated into multiple components.

In the learning environment 100, memory such as memory in the student device 104, the curation server 110, the third party server 124, and the search engine server 140 may include a non-transitory memory that stores data for providing the functionality described herein. The memory may be included in storage that may be a dynamic random access memory (DRAM) device, a static random access memory (SRAM) device, flash memory, or some other memory devices. In some embodiments, the storage also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

Figure 2:
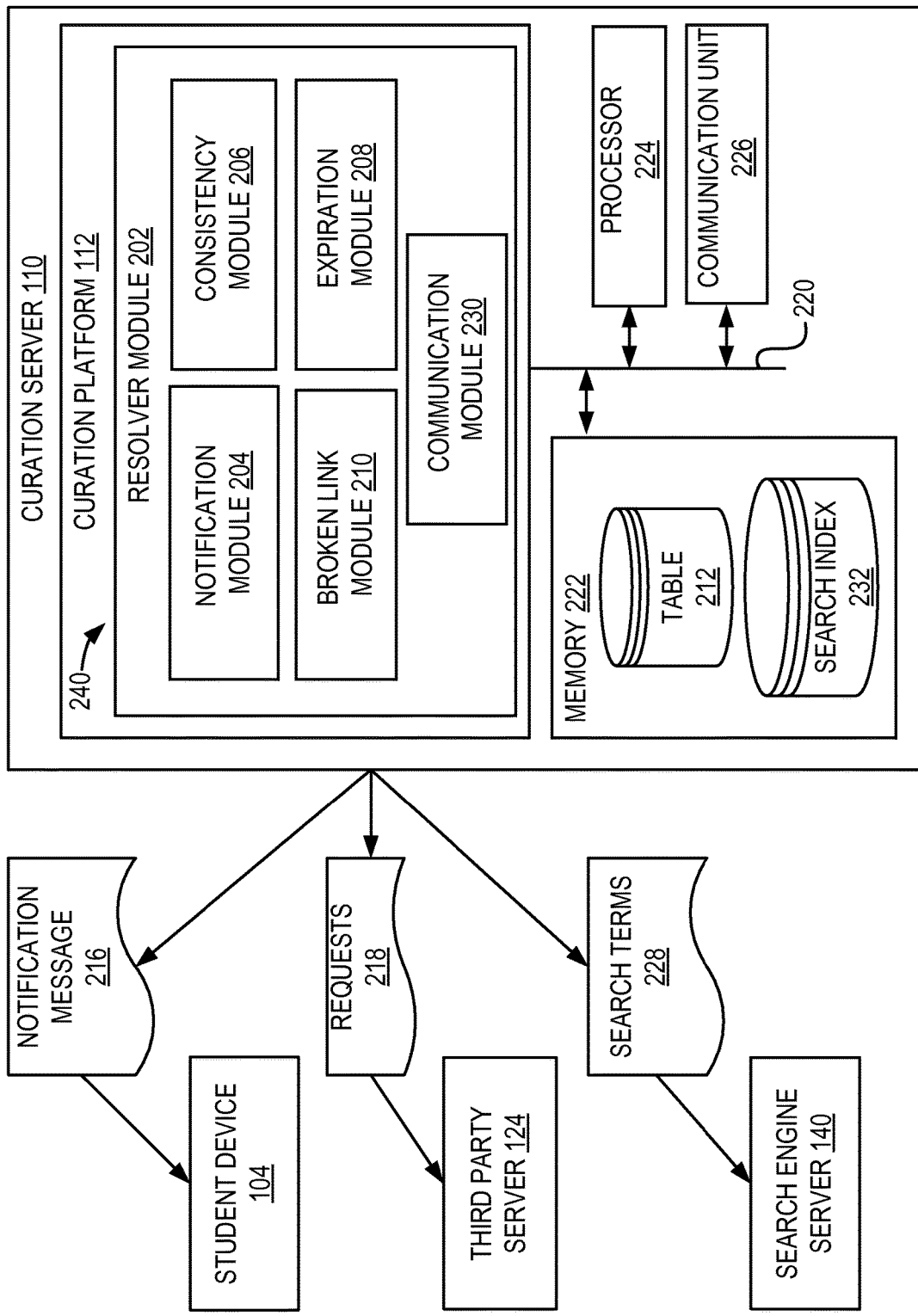
FIG. 2 is a block diagram of an example curation server that may be implemented in the learning environment of FIG. 1.

FIG. 2 illustrates an example of the curation server 110 including an example of the curation platform 112. The curation server 110 of FIG. 2 includes the curation platform 112, a processor 224, a memory 222, and a communication unit 226. The components (112, 222, 224, and 226) of the curation server 110 may be communicatively coupled by a bus 220.

The processor 224 may include an arithmetic logic unit (ALU), a microprocessor, a general-purpose controller, or some other processor array to perform computations and software program analysis. The processor 224 may be coupled to the bus 220 for communication with the other components (e.g., 112, 222, and 226). The processor 224 generally processes data signals and may include various computing architectures including a complex instruction set computer (CISC) architecture, a reduced instruction set computer (RISC) architecture, or an architecture implementing a combination of instruction sets. Although in FIG. 2 the curation server 110 includes a single processor 224, multiple processors may be included in the curation server 110. Other processors, operating systems, and physical configurations may be possible.

The memory 222 may be configured to store instructions and/or data that may be executed by the processor 224. The memory 222 may be coupled to the bus 220 for communication with the other components. The instructions and/or data may include code for performing the techniques or methods described herein. The memory 222 may include a DRAM device, an SRAM device, flash memory, or some other memory device. In some embodiments, the memory 222 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

One or more tables 212 may be included in the memory 222. The tables 212 may include an item table and/or a node table, for instance. The item table and the node table may include a list of items included in one or more curations and information pertaining to one or more of the items. For example, the item table may include for each of the items in a curation: an item identification, which may include a unique identifier assigned to the item; an item type, which may identify whether the item is an image or another document, for instance; an item title; an item description; a source link such as URL address; a stored item document, which may include a version of a document originally accessed from the third party server 124 on which an item is based; an item status; and an update date, which may indicate when an item or an item document is updated.

Similarly, the node table may include the information of the index table for one or more curations. Generally, nodes may be a more general reference to the items and other materials included in curations. In addition to the information of the index table, the node table may include a node identifier, which may include a unique identifier for each of the nodes; one or more tags, which may be a searching term assigned to a node; and an expiration date of a node.

In some embodiments, the node table and the item table may be a single table. Additionally or alternatively, the node table and the item table may include a subset of the information and/or additional information than that specifically enumerated above. Moreover, a subset of the information that may be included in the index table may be included in the node table and vice versa.

Additionally, a search index 232 may be included in the memory 222. The search index 232 may include information related to one or more other sources. For example, the search index 232 may include information related to one or more sources searched by a student such as the student 102. Additionally, the search index 232 may include information automatically added by the curation platform 112. For example, the curation platform 112 may crawl the third party server 124 to generate crawling list, which may be used to populate the search index 232. In some embodiments, the search index 232 may be populated using one or more operations discussed in U.S. application Ser. No. 14/245,764, entitled: "Collecting Learning Materials For Informal Learning," filed Apr. 4, 2014, which is incorporated herein by reference in its entirety.

For example, the search index 232 may include stored documents, identifiers for the stored documents, tags associated with the stored documents, source links (e.g., URLs) for the stored documents, update dates for the stored documents, or some combination thereof. The stored documents and the item document may include any digital document. Some examples of the stored documents and the item document may include images, web pages, videos, word documents, tables, spreadsheets, and the like.

The communication unit 226 may be configured to transmit and receive data to and from one or more of the student device 104, the third party server 124, and the search engine server 140. The communication unit 226 may be coupled to the bus 220. In some embodiments, the communication unit 226 includes a port for direct physical connection to the network 122 or to another communication channel. For example, the communication unit 226 may include a USB, SD, CAT-5, or similar port for wired communication with the components of the learning environment 100. In some embodiments, the communication unit 226 includes a wireless transceiver for exchanging data via communication channels using one or more wireless communication methods, including IEEE 802.11, IEEE 802.16, BLUETOOTH®, or another suitable wireless communication method.

In some embodiments, the communication unit 226 includes a wired port and a wireless transceiver. The communication unit 226 may also provide other connections to a network such as the network 122 of FIG. 1 for distribution of files and/or media objects using standard network protocols including transmission control protocol/internet protocol (TCP/IP), HTTP, HTTP secure (HTTPS), and simple mail transfer protocol (SMTP), etc. In some embodiments, the communication unit 226 includes a cellular communications transceiver for sending and receiving data over a cellular communications network including via SMS, MMS, HTTP, direct data connection, WAP, e-mail, or another suitable type of electronic communication.

In the embodiment of FIG. 2, the curation platform 112 includes a resolver module 202. The resolver module 202 may be configured to resolve outdated items. In particular, the resolver module 202 may be configured to resolve broken links, inconsistent linked content, and expired items. In some embodiments, the resolver module 202 may resolve the outdated items at a particular interval. For example, every day, hour, week, month, etc. the resolver module 202 may resolve the outdated items.

The resolver module 202 may further include a notification module 204, a consistency module 206, a broken link module 210, an expiration module 208, and a communication module 230 (collectively, the modules 240).

Each of the modules 240 may be implemented as software including one or more routines configured to perform one or more operations. The modules 240 may include a set of instructions executable by the processor 224 to provide the functionality described herein. In some instances, the modules 240 may be stored in or at least temporarily loaded into the memory 222 of the curation server 110 and may be accessible and executable by the processor 224. One or more of the modules 240 may be adapted for cooperation and communication with the processor 224 and components of the curation server 110 via the bus 220.

The communication module 230 may be configured to handle communications between the curation platform 112 and other components of the curation server 110 (e.g., 224, 222, and 226). The communication module 230 may be configured to send and receive data, via the communication unit 226, to the third party server 124, the student device 104, and the search engine server 140. In some instances, the communication module 230 may cooperate with the other modules (e.g., 202, 204, 206, 208, and 210) to receive and/or forward, via the communication unit 226, data from one or more of the third party server 124, the student device 104, and the search engine server 140.

In some embodiments, the communication module 230 may be configured to receive a curation including one or more items. For instance, the communication module 230 may receive the curation via the network 122 or may access the curation, which may be stored on the memory 222 in some embodiments. Additionally, the communication module 230 may access the tables 212 and/or the search index 232. The communication module 230 may communicate the curation, the tables 212, and the search index 232 to one or more of the other modules (e.g., 204, 206, 208, and 210).

The broken link module 210 may be configured to determine whether a source link of an item in the curation is broken. In some embodiments, the item, as it is organized in the curation, may include the source link. Additionally or alternatively, the source link may be included in one or more of the tables 212 and the search index 232. The broken link module 210 may generate a request 218, which may be communicated to the third party server 124 via the communication module 230. The request 218 may include an attempt to access a source of the item via the source link. For example, the item may include a portion of a news article. The source may be a website on which the news article is published. The request 218 may include, for example, an HTTP request sent to the source link such as a URL address.

In response to the request 218, the broken link module 210 may receive a failure. The failure may indicate that the source link is broken. For instance, the failure may indicate that the source link accesses a webpage that has been removed, deleted, renamed, or relocated. An example of the failure may include an HTTP Error 404.

In response to the broken link module 210 receiving the failure or another indication that the source link is broken, the broken link module 210 may locate an alternative item or an alternative source. The alternative item or the alternative source may include another source such as another website or item that may be substituted in the curation for the item with the broken source link. Additionally, in response to the broken link module 210 receiving the failure, the broken link module 210 may update a status of the item in one or more of the tables 212 as broken.

In some embodiments, the broken link module 210 may be configured to attempt to locate one or more internal alternative items or internal alternative sources (collectively, internal alternatives). The internal alternatives may be based on a comparison between an item document and the one or more stored documents. The item document may be included in one or more of the tables 212, the search index 232, or otherwise stored in the memory 222. Accordingly, the broken link module 210 may access the item document and access the stored documents. The broken link module 210 may then compare the item document to the stored documents to assess whether any of the stored documents are similar enough to the item document to be a suitable internal alternative.

The comparison may be based on a context similarity. The context similarity may treat the item document as a vector (or a bag of words) and treat each of the stored documents as vectors (or bags of words). The context similarity may be computed as the vector distance, such as the cosine, between the vector of the item document and the vectors of each of the stored documents. When the vector distance between the item document and one of the stored documents is above a particular threshold, the stored document may be considered to have the same or a similar topic and thus a suitable internal alternative. The particular threshold may be about 0.9, for instance.

In some embodiments, the context similarities may include element weights assigned to one or more elements of the item document and/or the stored documents. The elements may include particular portions of a document that may be more indicative or less indicative of the topic of the document. The elements may include a title, a heading, a subheading, a caption to an image, general text, and the like. For example, a first element weight may be assigned to a title and a second, lower element weight may be assigned to general text. Thus, the title of the item document matching the title of one of the stored documents may be weighted more heavily than a few words in the general text of the item document matching a few words in the general text of one of the stored documents.

In response to the broken link module 210 locating multiple internal alternatives, the broken link module 210 may sort the internal alternatives based on the context similarities. For instance, the stored document having the highest context similarity may be sorted to be first, followed by the stored document having the next-highest context similarity, etc. The broken link module 210 may then select one or more of the internal alternatives. For example, the broken link module 210 may select the top three internal alternatives.

The broken link module 210 may also attempt to locate external possible alternative sources (external alternatives). The external alternatives may include sources and items that are stored on the third party server 124. The broken link module 210 may execute a search for external alternatives by communicating search terms 228 to the search engine server 140. In some embodiments, the broken link module 210 may attempt to locate the external alternatives only when no internal alternatives are located.

The search terms 228 may be extracted from the item document. For instance, the search terms 228 may include one or more keywords with the highest keyword weights when item document is converted to a vector (or bag of words). The keywords may be identified using term frequency-inverse document frequency (TF-IDF) in some embodiments or another numerical statistic that may reflect importance of terms in the item document. In some embodiments, there may be a relationship between the importance of the terms in the item document and the element weights assigned thereto. The search engine server 140 may provide search results, which may include one or more suitable external alternatives. In some embodiments, external alternatives may be ranked or re-ranked as discussed elsewhere herein.

In some embodiments, if the broken link module 210 does not locate any suitable internal alternatives or external alternatives, then the broken link module 210 may make the broken source link unselectable. Accordingly, when viewed by a student or an audience, the source link may be greyed-out and may be non-responsive if the student or the audience selects the source link.

After the internal alternatives are selected and/or the external alternatives are located, the broken link module 210 may communicate the selected internal alternatives and/or the located external alternatives to the notification module 204. Additionally, the broken link module 210 may communicate an indication of whether and which source links are broken in the curation.

If, however, the source link is active (e.g., the broken link module 210 does not receive a failure), the broken link module 210 may communicate a signal indicating an active source link to the consistency module 206 and may update a status of the item in one or more of the tables 212 as live.

The consistency module 206 may be configured to determine whether linked content is consistent with the item document. The linked content may include current or accessed content that is present at the source link. By comparing the linked content with the item document, the consistency module 206 may determine whether the linked content is still relevant to the item. For example, the linked content may be overwritten after the original content is access from the source, which may result in the linked content being inconsistent with or irrelevant to the item.

In some embodiments, to determine whether linked content is consistent with the item document, the consistency module 206 may compare the item document with linked content. If there is a match or a substantial match between the item document and the linked content, then the consistency module 206 may determine there has been no change to the linked content and thus the linked content is consistent with the item.

The consistency module 206 may also be configured to locate internal alternatives and/or external alternatives if the item document does not match or substantially match the linked content. For example, as described above, the internal alternatives may be located based on a context similarity between the item document and source documents in the search index 232. Additionally, the external alternative may be located based on the search terms 228 extracted from the item document or multiple item documents included in the curation. For example, the consistency module 206 may combine the item documents or the items (combined content) and extract keywords from the combined content. Generally, the keywords extracted from the combined content may include a common context of the items, and may be indicative of the topics or subtopics of the curation. In some embodiments, the consistency module 206 may attempt to locate the external alternatives only when no internal alternatives are located.

In addition, the consistency module 206 may sort the external alternatives returned by the search engine server 140. For example, the consistency module 206 may rank the external alternatives based on presence of the extracted common context and/or based on a context similarity between the combined content and one or more of the search results returned by the search engine server 140. The context similarity may include element weights as discussed herein.

Additionally, in some embodiments, the consistency module 206 may narrow or re-rank the search results based on an update time. For instance, an external alternative having a most-recent update time may be re-ranked first, followed by another external alternative having a second-most recent update time, etc. Additionally or alternatively, the update time may be assigned an update weight. The consistency module 206 may re-ranked the external alternative incorporating the update time and the update weight. The consistency module 206 may then communicate one or more of the external alternatives and/or the internal alternatives to the notification module 204.

The expiration module 208 may be configured to locate updated content that is relevant to expired items. For example, one or more of the tables 212 and the search index 232 may include expiration dates of one or more of the items. The expiration dates may be entered by a student, may be a system default, may be inherent in a particular item or source of an item, or some combination thereof. Locating the updated content may provide to a student a newer substitute for an expired item.

In some embodiments, the expiration module 208 may determine whether an expiration date of an item is passed. Following an expiration date of the item, the expiration module 208 may combine content of one or more curated items in a curation (e.g., the combined content discussed above). The expiration module 208 may compare the combined content with stored documents that include a more recent update date (e.g., newer) than the item document. For example, the expiration module 208 may compute a context similarity between the combined content and stored documents having an update date more recent than the expiration date of the item document. The expiration module 208 may identify one or more of the stored documents as relevant content based on the comparison between the combined content and the stored documents. As above, identification of one or more of the stored documents as relevant may be based on the vector similarity being above a particular threshold value such as about 0.9. The expiration module 208 may then sort the identified stored documents based on the context similarity and select a particular number of the identified stored documents based on the context similarity. For example, the expiration module 208 may select five stored documents. The expiration module may then communicate the selected stored documents to the notification module 204.

The notification module 204 may be configured to generate a notification message 216. The notification message 216 may indicate whether and which of the source links of the items in the curation are broken, whether the linked content is consistent with the original content, any expired items, and any updated content, for instance. The communication module 230 may then communicate the notification message 216 to the student device 104. A student may modify the curation according to the notification message 216.

Figure 3A:
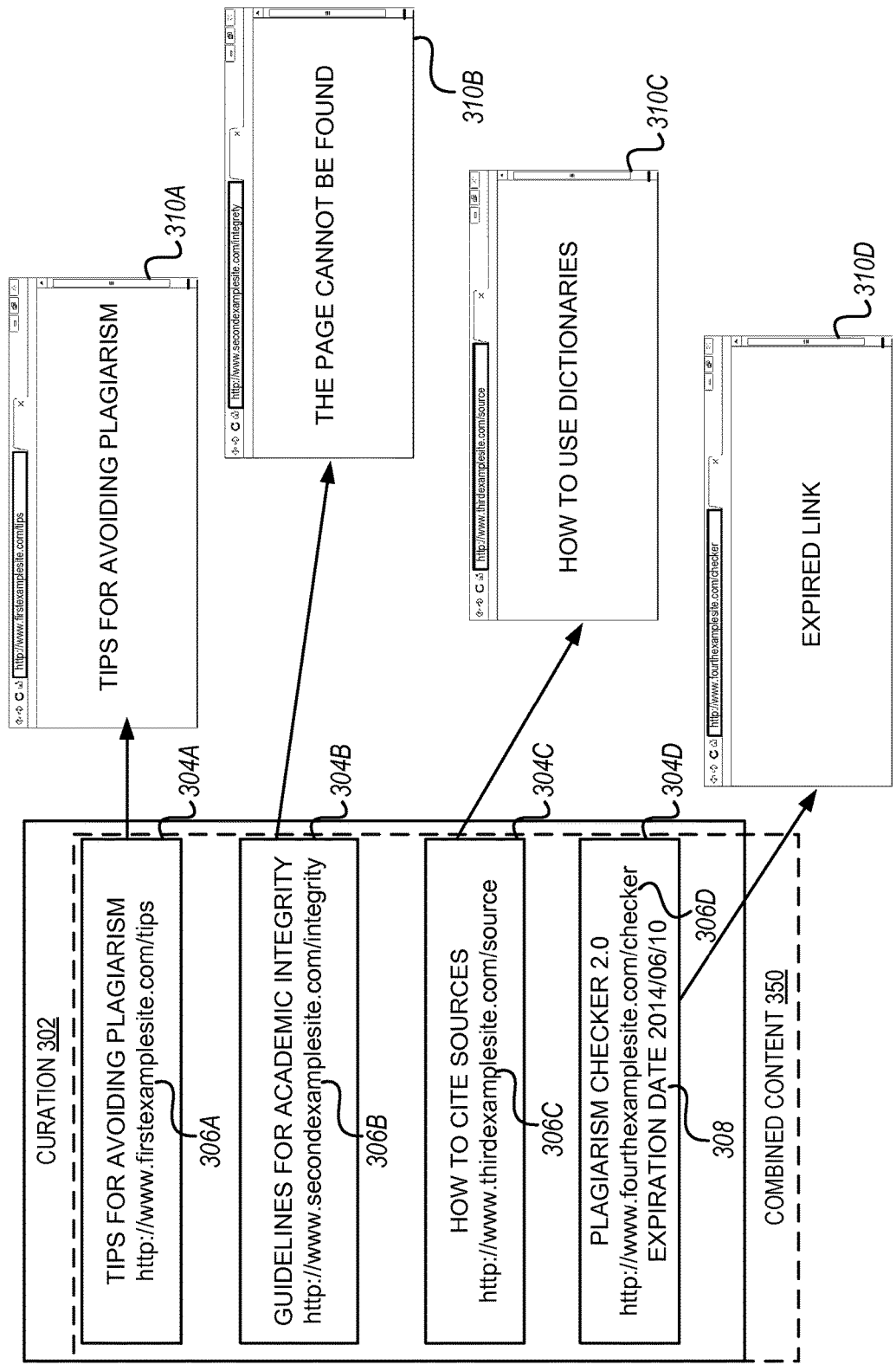
FIG. 3A illustrates an example broken source link determination of an example curation that may be implemented in the learning environment of FIG. 1.

FIG. 3A illustrates an example broken source link determination of an example curation 302, which includes items 304A-304D (generally, item 304 or items 304). Each of the items 304 may include source links 306A-306D (generally, source link 306 or source links 306). Additionally, a fourth item 304D includes an expiration date 308.

The curation 302 of FIG. 3A includes four items 304. Other curations may include more than four items 304 or fewer than four items 304. The source links 306 may additionally or alternatively be included in one or more tables such as the tables 212 of FIG. 2, for instance. Additionally still, the expiration date 308 may be included in the fourth item 304D as shown in FIG. 3A or in one or more tables such as the tables 212 of FIG. 2.

FIG. 3A also includes linked content 310A-310D (generally, linked content 310). The linked content 310 may be hosted on the third party server 124 of FIGS. 1 and 2, for example. To determine whether one of the source links 306 is broken, the linked content 310 may be accessed. For example, the linked content 310 may be accessed by sending a request to the source links 306. In FIG. 3A, a second linked content 310B is a failure, which may indicate that a second source link 306B is broken. A first, a third, and a fourth linked content 310A, 310C, and 310D are active, which may indicate that a first, a third, and a fourth source links 306A, 306C, and 306D are not broken. The determination that the second linked content 310B is a failure and that the first, third, and fourth linked content 310A, 310C, and 310D are active may be performed, for example, by the broken link module 210 based on the description above, in some embodiments.

Figure 3B:
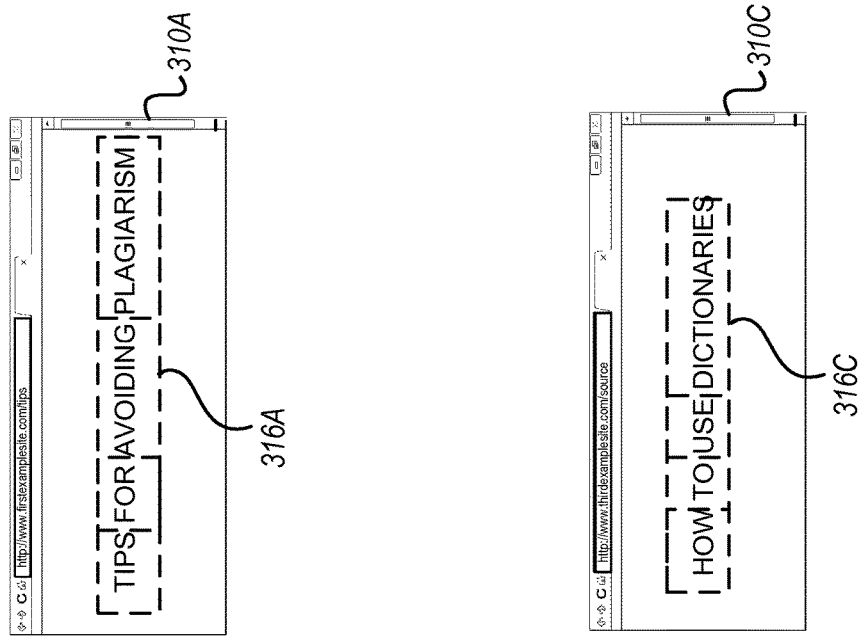
FIG. 3B illustrates an example consistency determination between linked content and a first item document and a third item document that may be implemented in the learning environment of FIG. 1.
Figure 3B:
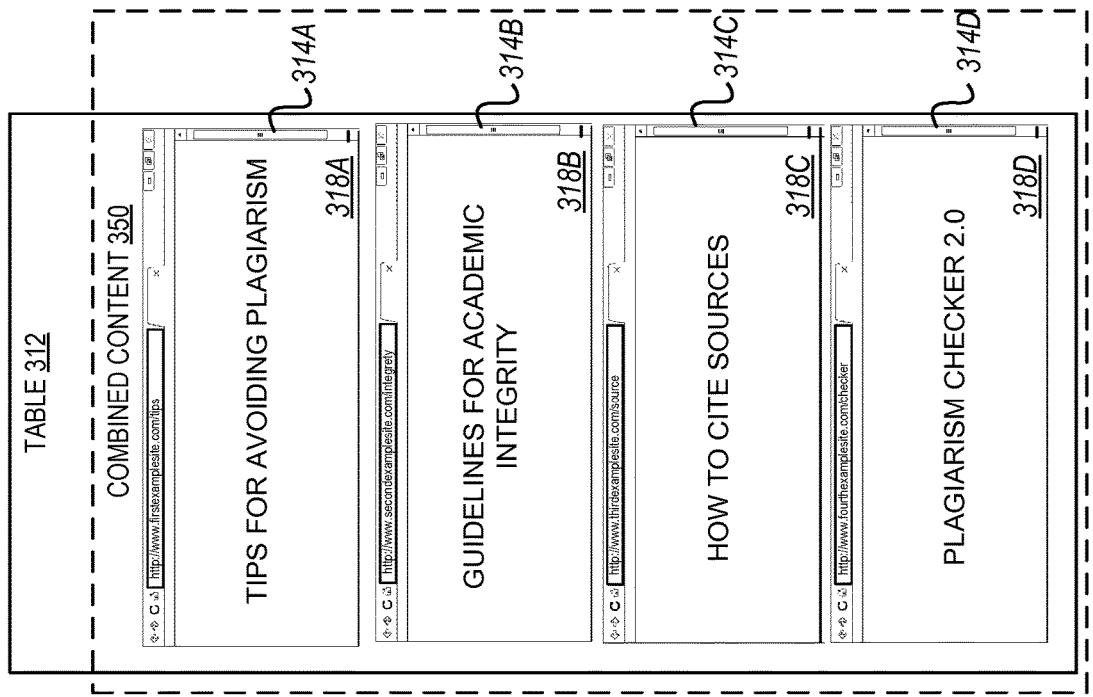

FIG. 3B illustrates an example consistency determination between the first and third linked contents 310A and 310C and a first item document 314A and a third item document 314C (generally, item documents 314), respectively, of first and third items 304A and 304C of the curation 302 of FIG. 3A. The item documents 314 may be included in a table 312. The table 312 may be stored in a memory of a curation server such as the curation server 110 of FIGS. 1 and 2. Generally, the item documents 314 may include a cached version of original content on which the first and third items 304A and 304C of FIG. 3A are based. The item documents 314 may be saved to the table 312 when the linked content is accessed to create the corresponding items (e.g., 304A and 304C) in the curation 302 and/or may be updated periodically during processes in which outdated items are resolved.

The consistency determination may include a comparison between the item documents 314 and the corresponding linked content 310. For example, the consistency determination may include computing a context similarity between the item documents 314 and the corresponding linked content 310. In particular, in FIG. 3B, the first item document 314A may be compared with the first linked content 310A and the third item document 314C may be compared to the third linked content 310C. In some embodiments, comparisons depicted in FIG. 3B may include computing similarities between contexts 318A and 318C of the item documents 314A and 314C and contexts 316A and 316C of the linked content 310A and 310C, respectively. In the example depicted in FIG. 3B, a comparison between the first item document 314A and the first linked content 310A may indicate that there is a high level of consistency (e.g., a match or substantial match) between the first item document 314A and the first linked content 310A. Additionally, a comparison between the third item document 314C and the third linked content 310C may indicate that there is a low level of consistency between the third item document 314C and the third linked content 310C. The consistency determination and/or the context similarity may be performed, for example, by the consistency module 206 based on the description above, in some embodiments.

Figure 3C:
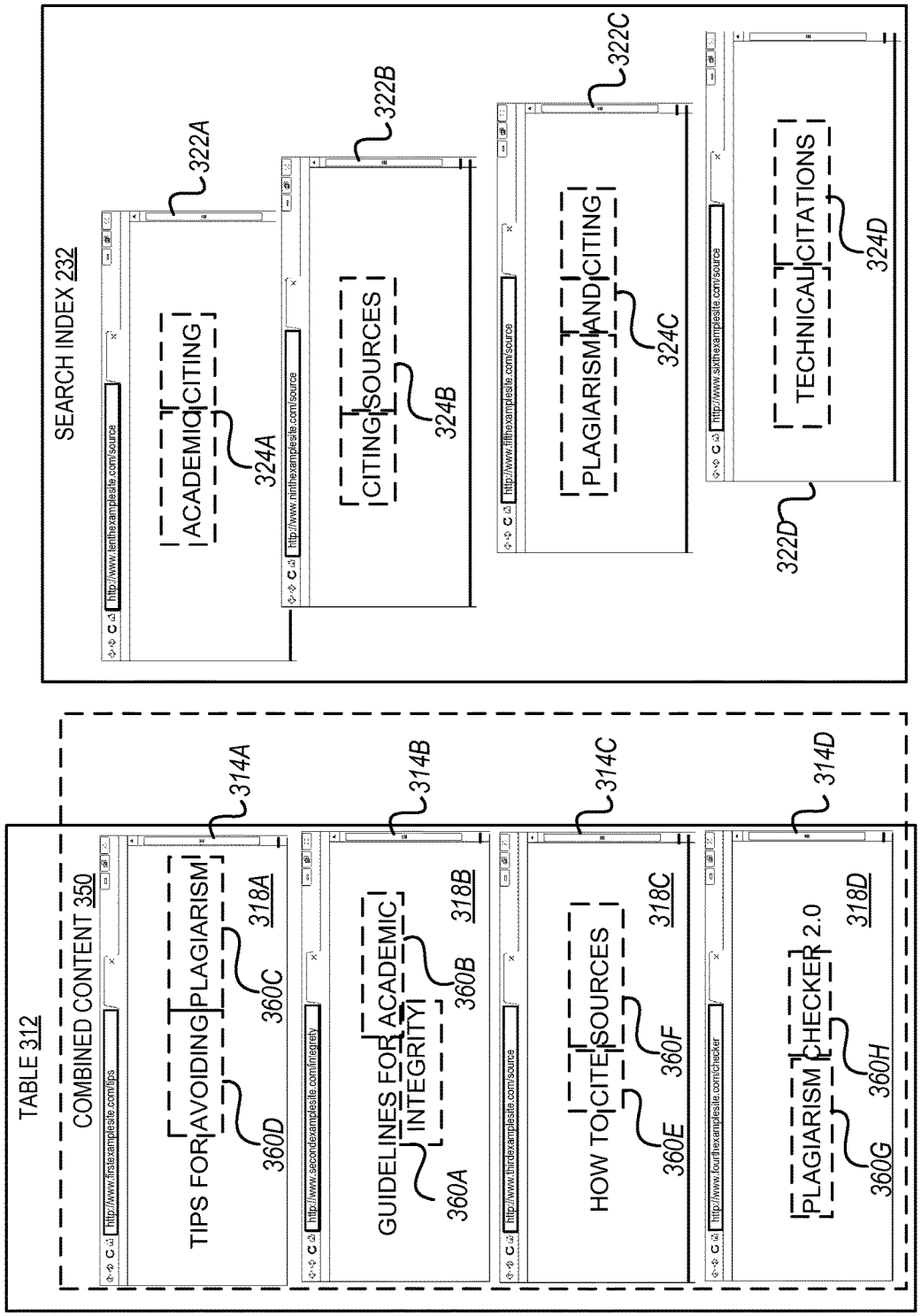
FIG. 3C illustrates an example of locating internal alternatives for the third item document of FIG. 3B.

FIG. 3C illustrates an example of locating internal alternatives for the third item document 314C. The example depicted in FIG. 3C may be performed in response to a low level of consistency between the third linked content 310C and the third item document 314C. Additionally or alternatively, an analogous process of locating internal alternatives may be performed for a second item 304B in response to a broken source link (e.g., the second source link 306B). The internal alternatives may include a subset of stored documents 322A-322D that include content consistent with the content of the third item document 314C.

The stored documents 322 may include one or more documents that are stored on the search index 232, for instance. In some embodiments, the stored documents 322 may be added in the search index 232 by a process performed by a curation platform that locates the stored documents 322 and/or by searches conducted by a student while creating and updating the curation.

Locating internal alternatives may include comparing the third item document 314C with each of the stored documents 322. In some embodiments, the comparison may be based on a computed context similarity between the context 318C of the third item document 314C and contexts 324A-324D of the stored documents 322. The context similarities may form the basis of a ranking and/or selection of one or more of the stored documents 322 as suitable internal alternatives. Locating the internal alternatives for the third item document 314C may be performed, for example, by the consistency module 206 based on the description above, in some embodiments.

FIG. 3C further illustrates an example of locating internal alternatives for the fourth item 304D of FIG. 3A which is expired. Referring back to FIG. 3A, it may be determined whether the expiration date 308 of the fourth item 304D has passed. The determination may be based on an internal clock or calendar. With reference to FIG. 3C, in response to the expiration date 308 being passed, keywords 360A-360H (common context 360) may be extracted from combined content 350 of all of the items 304 of FIG. 3A and/or all of the item documents 314 of FIG. 3C. For example, the common context 360 may be found using TF-IDF of the combined content 350. The internal alternatives may include a subset of stored documents 322A-322D that include content consistent with the common context 360 of the combined content 350 and that are newer than the fourth item 304D.

Locating internal alternatives may include comparing the keywords 360A-360H with each of the stored documents 322. In some embodiments, the comparison may be based on a computed context similarity between the common context 360 and the contexts 324A-324D of the stored documents 322. The context similarities may form the basis of a ranking and/or selection of one or more of the stored documents 322 as suitable internal alternatives. Locating the internal alternatives may be performed, for example, by the consistency module 206 based on the description above, in some embodiments.

Figure 3D:
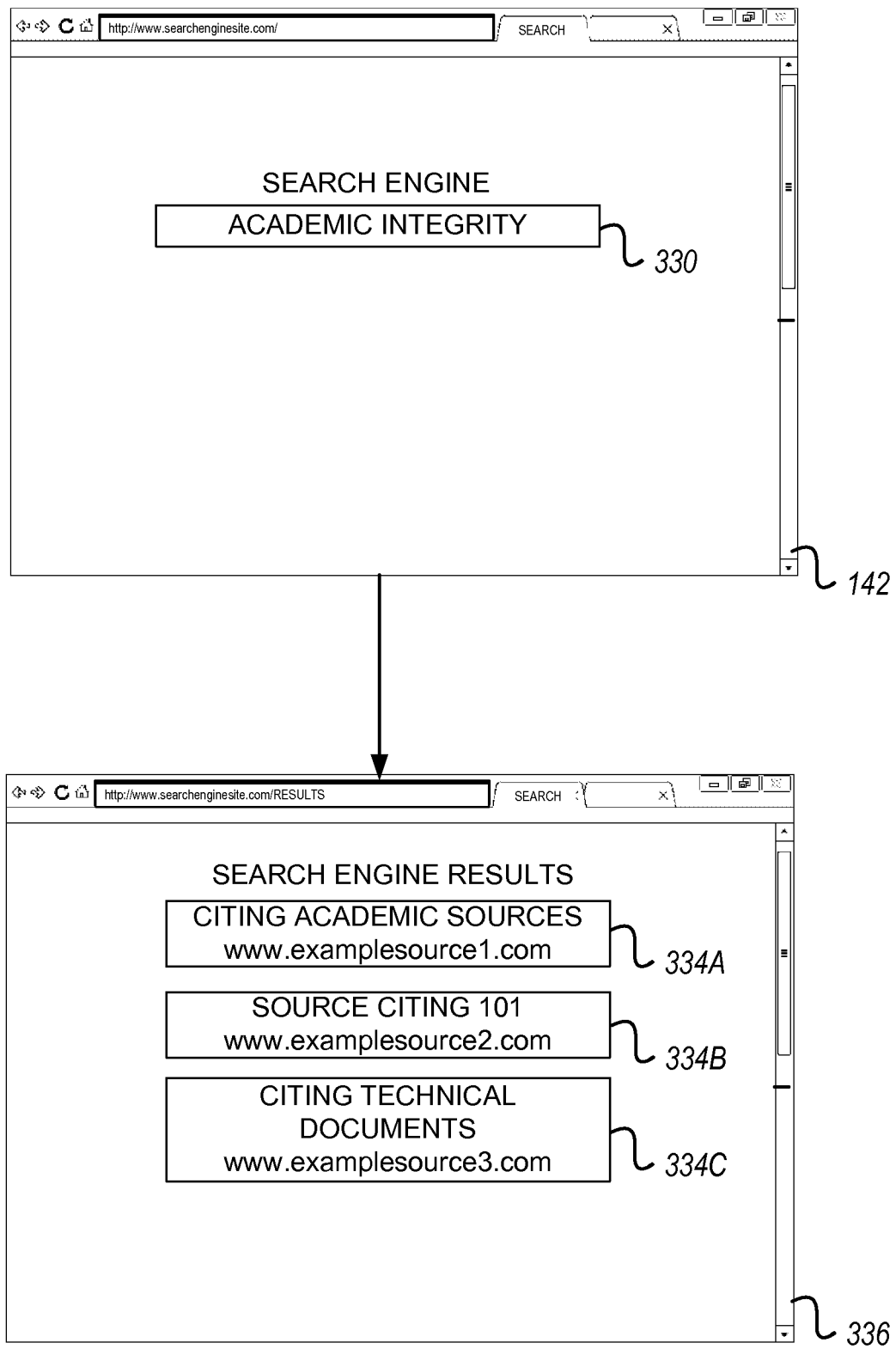
FIG. 3D illustrates an example of locating external alternatives.

FIGS. 3C and 3D further illustrate an example of locating external alternatives for a second item document 314B for the second item 304B having a broken second source link 306B. The example depicted in FIGS. 3C and 3D may be performed in response to the second item 304B having the broken source link 306 and/or in response to no internal alternatives being located. Locating the external alternatives may include extracting search terms for the second item document 314B. For example, search terms may include the keywords 360A and 360B extracted from the context 318B of the second item document 314B using TF-IDF. Referring to FIG. 3D, the keywords 360A and 360B may be entered as search terms 330.

The search terms 330 may be entered into the search engine 142 of FIG. 1. In response to the search terms 330 being entered into the search engine 142, search results 334A-334C (search results 334) may be found. The search results 334 may include links to sources that may be consistent with the second item document 314B. In some embodiments, the search results 334 may be included on a search results page 336. Locating the external alternatives may be performed, for example, by the broken link module 210 based on the description above, in some embodiments.

Figure 3E:
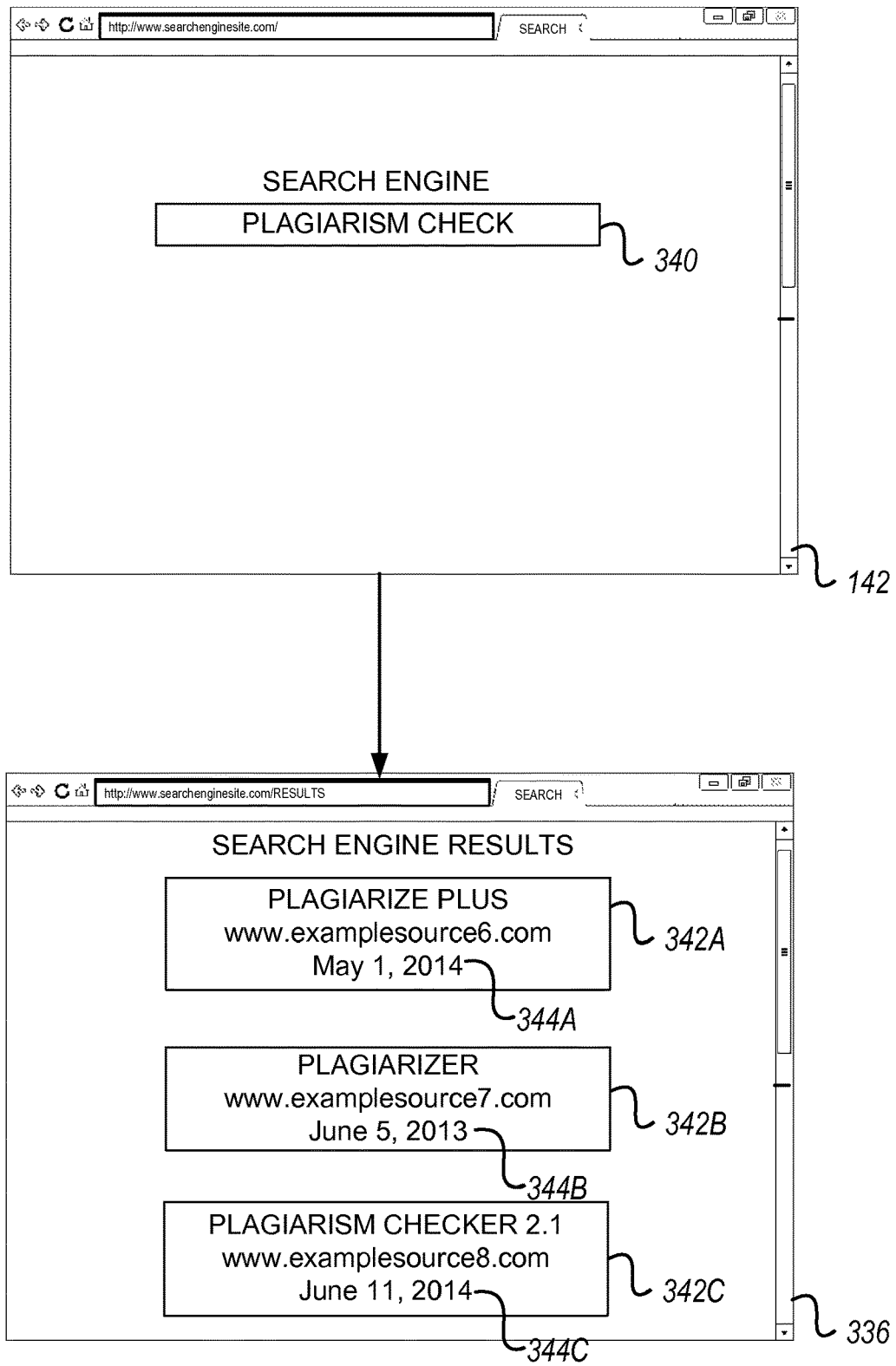
FIG. 3E illustrates an example of locating updated content that may be implemented in the learning environment of FIG. 1.

FIGS. 3C and 3E illustrate an example of locating external alternatives for the third item document 314C for the third item 304C having inconsistent third linked content 310C. The example depicted in FIGS. 3C and 3E may be performed in response to a low level of consistency between the third linked content 310C and the third item document 314C and/or in response to not finding suitable internal alternatives for the third linked content 310C.

Locating the external alternatives may include extracting the common context 360 from the combined content 350. Referring to FIG. 3E, the common context 360 or some examples thereof may be entered as search terms 340 into the search engine 142. In response to the search terms 340, search results 342A-342C (search results 342) may be found. The search results 342 may include links to sources that may be more consistent with the third item document 314C. In some embodiments, the search results 342 may be included on the search results page 336.

The search results 342 may be ranked according to a comparison between the common context 360 and content of each of the search results. Additionally, each of the search results may include update dates 344A-344C. The search results 342 may be re-ranked or narrowed according to the update dates 344A-344C. Locating the external alternatives may be performed, for example, by the consistency module 206 based on the description above, in some embodiments.

The examples depicted in FIGS. 3A-3E represent simplified examples. In some embodiments, the entirety of the linked content 310, the item documents 314, the stored documents 322, the search results 334/342, etc. may be included in comparisons. Moreover, in some embodiments, one or more elements of the item document 314, the linked content 310, the stored documents 322, and the search results 334/342 may be assigned an element weight. The element weight(s) may be used in the context similarity computations.

Figure 4:
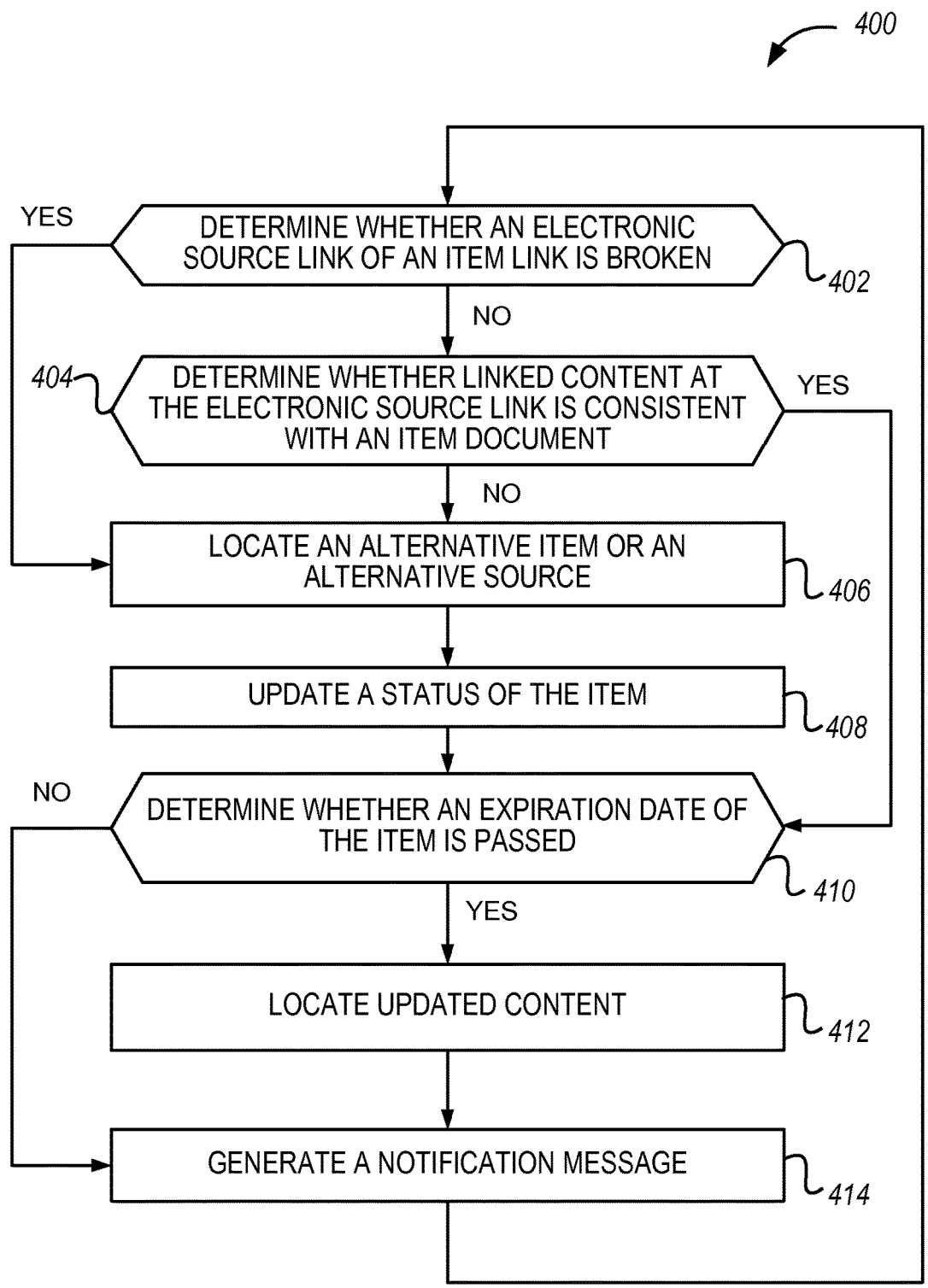
FIG. 4 is a flow diagram of an example method of resolving items in a curation.

FIG. 4 is a flow diagram of an example method 400 of resolving items in a curation, arranged in accordance with at least one embodiment described herein. The method 400 may be programmably performed in some embodiments by the curation server 110 described with reference to FIGS. 1 and 2. The curation server 110 may include or may be communicatively coupled to a non-transitory computer-readable medium (e.g., the memory 222 of FIG. 2) having stored thereon or encoded therein programming code or instructions that are executable by a processor to perform or cause performance of the method 400. The curation server 110 may include a processor (e.g., the processor 224 of FIG. 2) that is configured to execute computer instructions to cause or control performance of the method 400. Although illustrated as discrete blocks, various blocks may be divided into additional blocks, combined into fewer blocks, or eliminated, depending on the desired implementation.

The method 400 may begin at block 402. At block 402, it may be determined whether an electronic source link of an item is broken. In some embodiments, determining whether the electronic source link of the item is broken includes sending a request to the electronic source link. The electronic source link may include a last recorded URL address of the item, which may be stored in an item table. In response to the electronic source link being broken ("YES" at block 402), the method 400 may proceed to block 406. In response to the electronic source link not being broken ("NO" at block 402), the method 400 may proceed to block 404.

At block 404, it may be determined whether linked content at the electronic source link is consistent with an item document. In response to the electronic source link being consistent with the item document, ("YES" at block 404), the method 400 may proceed to block 408. In response to the electronic source link being inconsistent with the item document, ("No" at block 404), the method 400 may proceed to block 406. At block 406, an alternative item or an alternative source may be located. At block 408, a status of the item may be updated. For example, in response to a request failure, a status of the item may be updated in the item table as broken. Additionally, in response to a request success, a status of the item is updated in the item table as live.

At block 410, it may be determined whether an expiration date of the item is passed. In response to the expiration date being passed ("YES" at block 410), the method 400 may proceed to block 412. In response to the expiration date not being passed ("No" at block 410), the method 400 may proceed to block 414. At block 412, updated content may be located. The updated content may be located following an expiration date of the curated item. The updated content may be relevant to the curated item. At block 414, a notification message may be generated. The notification message may indicate, for instance, whether the source link of the curated item is broken, whether the linked content is consistent with the item document, and the updated content.

In some embodiments, the method 400 may proceed from block 414 to block 402 at a particular interval. For example, one or more of the blocks of the method 400 may be performed daily, weekly, hourly, etc.

One skilled in the art will appreciate that, for the method 400 and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

Figure 5:
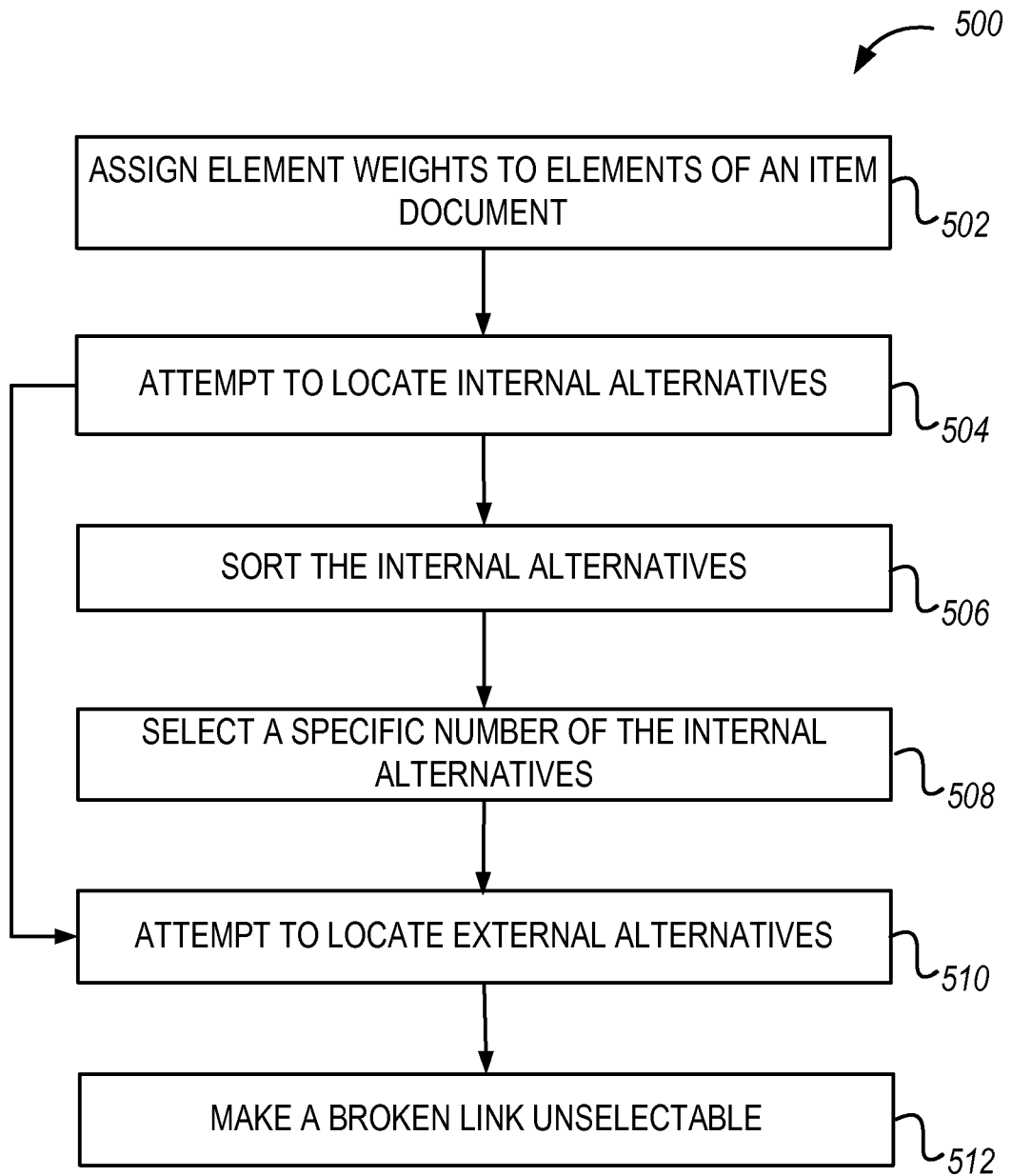
FIG. 5 is a flow diagram of an example method of locating an alternative item or an alternative source for a broken source link.

FIG. 5 is a flow diagram of an example method 500 of locating an alternative item or an alternative source for a broken source link, arranged in accordance with at least one embodiment described herein. The method 500 may be programmably performed in some embodiments by the curation server 110 described with reference to FIGS. 1 and 2. The curation server 110 may include or may be communicatively coupled to a non-transitory computer-readable medium (e.g., the memory 222 of FIG. 2) having stored thereon or encoded therein programming code or instructions that are executable by a processor to perform or cause performance of the method 500. The curation server 110 may include a processor (e.g., the processor 224 of FIG. 2) that is configured to execute computer instructions to cause or control performance of the method 500. Although illustrated as discrete blocks, various blocks may be divided into additional blocks, combined into fewer blocks, or eliminated, depending on the desired implementation.

The method 500 may begin at block 502. At block 502, element weights may be assigned to elements of the item document. Elements may include title, subtitles, topics, subtopics, text, etc. of the item document. The element weights may enable a commonality between a first element (e.g., a title) to be more heavily weighted than a second element (e.g., text). At block 504, an attempt to locate internal alternatives may be performed. The attempt to locate the internal alternatives may be based on a comparison between the item document and the one or more stored documents. For example, the comparison may include a context similarity between the item document and the stored documents, which may be computed to factor in the element weights.

The method 500 may proceed from block 504 to block 506 if internal alternatives are located. Alternatively, the method 500 may proceed from block 504 to block 510 if no internal alternatives are located. At block 506, the internal alternatives may be sorted. For example, the internal alternatives may be sorted based upon the context similarity. At block 508, a specific number of the internal alternatives may be selected. For example, the specific number may be three, which may include the three located internal alternatives having the highest context similarity. Additionally or alternatively, all of the located internal alternatives may be selected having a context similarity above a particular threshold (e.g., 0.92).

At block 510, an attempt to locate external alternatives may be performed. The attempt to locate external alternatives may include executing a search on an external search engine. The search terms entered into the external search engine may include a keyword within the item document, which may be extracted based on a TF-IDF analysis.

At block 512, a broken link may be made unselectable. For example, in response to no internal alternatives and no external alternatives, a broken link associated with an item may be made unselectable to a student or an audience.

Figure 6:
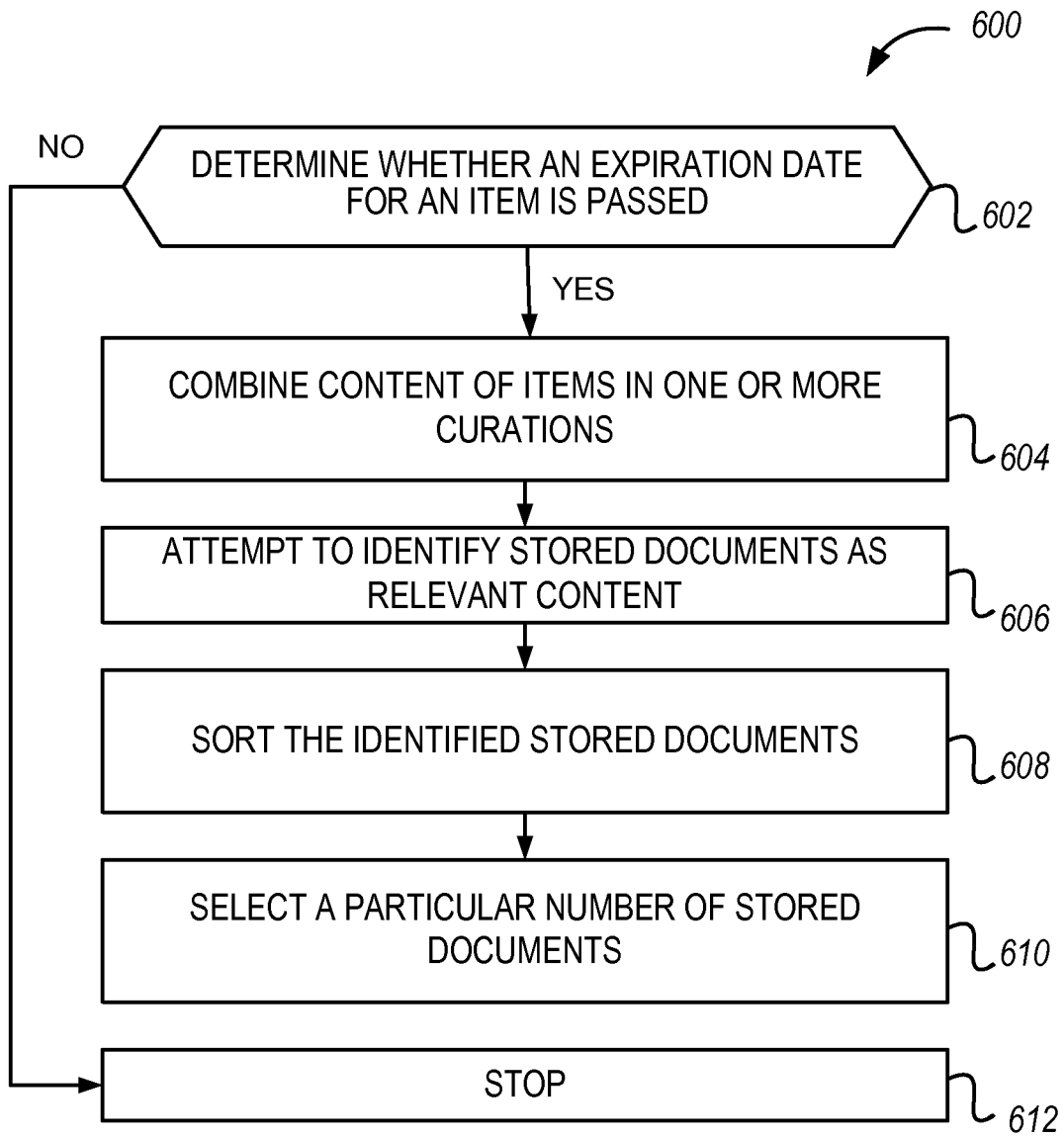
FIG. 6 is a flow diagram of an example method of locating updated content.

FIG. 6 is a flow diagram of an example method 600 of locating updated content, arranged in accordance with at least one embodiment described herein. The method 600 may be programmably performed in some embodiments by the curation server 110 described with reference to FIGS. 1 and 2. The curation server 110 may include or may be communicatively coupled to a non-transitory computer-readable medium (e.g., the memory 222 of FIG. 2) having stored thereon or encoded therein programming code or instructions that are executable by a processor to perform or cause performance of the method 600. The curation server 110 may include a processor (e.g., the processor 224 of FIG. 2) that is configured to execute computer instructions to cause or control performance of the method 600. Although illustrated as discrete blocks, various blocks may be divided into additional blocks, combined into fewer blocks, or eliminated, depending on the desired implementation.

The method 600 may begin at block 602. At block 602, it may be determined whether an expiration date for an item is passed. In response to the expiration date not being passed ("No" at 602), the method 600 may proceed to block 612, where the method 600 may stop. In response to the expiration date being passed ("Yes" at 602), the method 600 may proceed to block 604. At block 604, content of one or more items in one or more curations may be combined. For example, all the content of all the items in a curation may be combined. The content may be combined using element weights assigned to one or more elements of the items in some embodiments.

At block 606, an attempt to identify stored documents as relevant content may be performed. The stored documents may include a subset of the stored documents that are newer than the items. To identify the stored documents as relevant, the combined content may be compared with the stored documents. In some embodiments, the combined content may be compared using a computed context similarity between the combined content and each of the stored documents.

At block 608, the identified stored documents may be sorted. For example, the identified stored documents may be sorted based on a context similarity between the combined content and the identified stored documents. At block 610, a particular number of the identified stored documents may be selected. For example, the particular number of the identified stored documents may be selected based on the context similarity.

Figure 7:
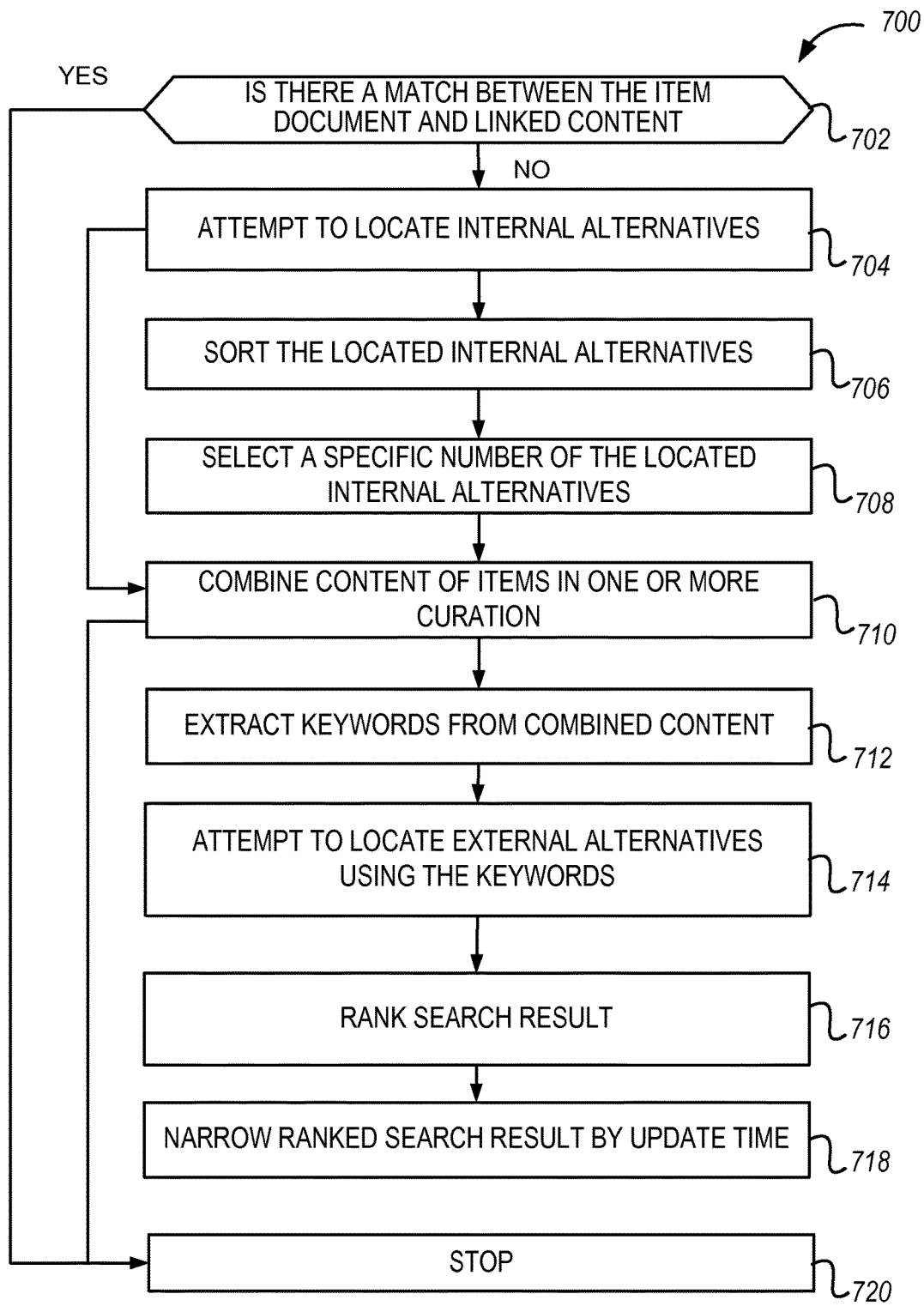
FIG. 7 is a flow diagram of an example method of locating an alternative item or an alternative source for an inconsistent source link.

FIG. 7 is a flow diagram of an example method 700 of locating an alternative item or an alternative source for an inconsistent source link, arranged in accordance with at least one embodiment described herein. The method 700 may be programmably performed in some embodiments by the curation server 110 described with reference to FIGS. 1 and 2. The curation server 110 may include or may be communicatively coupled to a non-transitory computer-readable medium (e.g., the memory 222 of FIG. 2) having stored thereon or encoded therein programming code or instructions that are executable by a processor to perform or cause performance of the method 700. The curation server 110 may include a processor (e.g., the processor 224 of FIG. 2) that is configured to execute computer instructions to cause or control performance of the method 700. Although illustrated as discrete blocks, various blocks may be divided into additional blocks, combined into fewer blocks, or eliminated, depending on the desired implementation.

The method 700 may begin at block 702. At block 702, it may be determined whether there is a match between an item document and linked content. In response to a match between the item document and the linked content ("YES" at 702), the method 700 may proceed to block 720, where the method 700 may stop. In response to there not being a match between the item document and the linked content ("No" at 702), the method 700 may proceed to block 704.

At block 704, an attempt to locate internal alternatives may be performed. The attempt to locate the internal alternatives may be based on a comparison between the item document and one or more stored documents. Additionally, the attempt to locate the internal alternatives may include assigning one or more element weights to one or more elements of the item document. In these and other embodiments, the comparison may include context similarities between the item document and the stored documents that factor in the element weights. The method 700 may proceed from block 704 to block 710 if no internal alternatives are located. Alternatively, the method 700 may proceed from block 704 to block 708 if the internal alternatives are located.

At block 706, the located internal alternatives may be sorted. For example, the located internal alternatives may be sorted according to the computed context similarities. At block 708, a specific number of the located internal alternatives may be selected. For example, a specific number (e.g., five) of the located internal alternatives may be selected.

At block 710, content of one or more items in one or more curations may be combined. For example, all the content of all the items in a curation may be combined. The content may be combined using element weights assigned to one or more elements of the items in some embodiments. At block 712, keywords may be extracted from the combined content. For example, the keywords may be identified using TF-IDF and extracted.

At block 714, an attempt to locate external alternatives may be performed. The attempt to locate external alternatives may include executing a search on an external search engine using the extracted keywords. At block 716, the external search results may be ranked. For example, the external search results may be ranked according to a comparison with the common content. The comparison may be based on a computed context similarity between the common context and each of the external search results. At block 718, the ranked search results may be narrowed by an update time.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What we claim is:
1. A method of resolving outdated items within curated content, the method comprising:
   determining whether an electronic source link of a curated item that is included in the curated content is broken;
   in response to the electronic source link not being broken:

determining whether linked content at the electronic source link is consistent with a version of a document originally accessed on which the curated item is based (item document), and in response to the linked content not being consistent with the item document:

locating an alternative source for an inconsistent source link by:

combining content from two or more curated items of the curated content;

identifying a common context of the combined content, the common context being indicative of a topic of the curated content; and executing a search on an external search engine using the common context to obtain two or more external alternatives to the curated item;

computing vector distances between each of the two or more external alternatives and the combined content;

obtaining an update time of each of the two or more external alternatives; and ranking the two or more external alternatives based on the computed vector distances and the update times;

based on the ranking, selecting one of the two or more external alternatives to replace the curated item in the curated content; and replacing the electronic source link with an alternative electronic link of the selected external alternative;

in response to the electronic source link being broken, locating an alternative item by:

assigning an element weight to elements of the item document, the element weight being based on a function of the element in the item document, and comparing the item document and one or more cached documents in a search index (stored documents) based on a context similarity between elements of the item document and corresponding elements of the stored documents factoring in the element weights assigned to the compared elements; and following an expiration date of the curated item, locating updated content that is relevant to the curated item.

2. The method of claim 1, further comprising generating a notification message indicating whether the electronic source link of the curated item is broken, whether the linked content is consistent with the item document, and the updated content.

3. The method of claim 1, further comprising:
waiting a particular interval;
after the particular interval, determining whether the electronic source link is broken;
in response to the electronic source link not being broken, determining whether linked content at the electronic source link is consistent with a version of the item document, and in response to the linked content not being consistent with the item document, locating an alternative item or an alternative source;
in response to the electronic source link being broken, locating an alternative item or an alternative source; and
locating updated content that is relevant to the curated item in response to passing of an expiration date of the curated item.

4. The method of claim 1, wherein the determining whether the electronic source link of the curated item is broken includes sending a request to the electronic source link, the method further comprising:
in response to a request failure, updating a status of the curated item in an item table as broken; and
in response to a request success, updating a status of the curated item in the item table as live.

5. The method of claim 1, wherein the locating the alternative item or the alternative source for a broken source link includes in response to no alternative item and no external alternatives being located, making a broken link associated with the curated item unselectable.

6. The method of claim 1, wherein the locating the updated content includes:
in response to the expiration date being past, combining content of one or more curated items;
attempting to identify one or more of the cached documents in the search index (stored documents) which are newer than the curated item as relevant content based on a comparison between the combined content and the cached documents;
sorting the identified stored documents based on a context similarity between the combined content and the identified stored documents; and
selecting a particular number of identified cached documents based on the context similarity.

7. The method of claim 1, wherein the locating the alternative item or the alternative source for the inconsistent source link includes:
determining whether there is a match between the item document and the linked content; and
in response to there not being a match between the item document and the linked content:
assigning one or more element weights to one or more elements of the item document;
attempting to locate internal alternatives based on a comparison between the item document and one or more cached documents in the search index (stored documents), wherein the comparison includes context similarities between the item document and the stored documents that factor in the element weights;
in response to the internal alternatives being located, sorting the internal alternatives; and
selecting a specific number of the internal alternatives.

8. The method of claim 1, wherein ranking the two or more external alternatives includes:
ranking the two or more external alternatives according to the computed vector distances; and
narrowing the ranked two or more external alternatives by an update time.

9. A non-transitory computer-readable medium having encoded therein programming code executable by a processor to perform or control performance of operations comprising:
determining whether an electronic source link of a curated item that is included in a curated content is broken;
in response to the electronic source link not being broken:
determining whether linked content at the electronic source link is consistent with a version of a document originally accessed on which the curated item is based (item document), and
in response to the linked content not being consistent with the item document:
locating an alternative source for an inconsistent source link by:
combining content from two or more curated items of the curated content;

identifying a common context of the combined content, the common context being indicative of a topic of the curated content; and executing a search on an external search engine using the common context to obtain two or more external alternatives to the curated item;

computing vector distances between each of the two or more external alternatives and the combined content;

obtaining an update time of each of the two or more external alternatives; and ranking the two or more external alternatives based on the computed vector distances and the update times;

based on the ranking, selecting one of the two or more external alternatives to replace the curated item in the curated content; and replacing the electronic source link with an alternative electronic link of the selected external alternative;

in response to the electronic source link being broken, locating an alternative item by:

assigning an element weight to elements of the item document, the element weight being based on a function of the element in the item document, and comparing the item document and one or more cached documents in a search index (stored documents) based on a context similarity between elements of the item document and corresponding elements of the stored documents factoring in the element weights assigned to the compared elements; and following an expiration date of the curated item, locating updated content that is relevant to the curated item.

10. The non-transitory computer-readable medium of claim 9, wherein the operations further comprise generating a notification message indicating whether the electronic source link of the curated item is broken, whether the linked content is consistent with the item document, and the updated content.

11. The non-transitory computer-readable medium of claim 9, wherein the operations further comprise:

waiting a particular interval;

after the particular interval, determining whether the electronic source link is broken;

in response to the electronic source link not being broken, determining whether linked content at the electronic source link is consistent with a version of the item document, and in response to the linked content not being consistent with the item document, locating an alternative item or an alternative source;

in response to the electronic source link being broken, locating an alternative item or an alternative source; and locating updated content that is relevant to the curated item in response to passing of an expiration date of the curated item.

12. The non-transitory computer-readable medium of claim 9, wherein:

the determining whether the electronic source link of the curated item is broken includes sending a request to the electronic source link, and the operations further comprise:

in response to a request failure, updating a status of the curated item in an item table as broken; and in response to a request success, updating a status of the curated item in the item table as live.

13. The non-transitory computer-readable medium of claim 9, wherein the locating the alternative item or the alternative source for a broken source link includes in response to no alternative item and no external alternatives being located, making a broken link associated with the curated item unselectable.

14. The non-transitory computer-readable medium of claim 9, wherein the locating the updated content includes:

in response to the expiration date being past, combining content of one or more curated items;

attempting to identify one or more of the cached documents in the search index (stored documents) which are newer than the curated item as relevant content based on a comparison between the combined content and the cached documents;

sorting the identified stored documents based on a context similarity between the combined content and the identified stored documents; and selecting a particular number of identified cached documents based on the context similarity.

15. The non-transitory computer-readable medium of claim 9, wherein the locating the alternative item or the alternative source for the inconsistent source link includes:

determining whether there is a match between the item document and the linked content; and in response to there not being a match between the item document and the linked content:

assigning one or more element weights to one or more elements of the item document;

attempting to locate internal alternatives based on a comparison between the item document and one or more cached documents in the search index (stored documents), wherein the comparison includes context similarities between the item document and the stored documents that factor in the element weights;

in response to the internal alternatives being located, sorting the internal alternatives; and selecting a specific number of the internal alternatives.

16. The non-transitory computer-readable medium of claim 9, wherein ranking the two or more external alternatives includes:

ranking the two or more external alternatives according to the computed vector distances; and narrowing the ranked two or more external alternatives by an update time.

* * * * *